(12) United States Patent
Farm

(10) Patent No.: US 7,182,186 B2
(45) Date of Patent: Feb. 27, 2007

(54) HYDRODYNAMIC BRAKE

(75) Inventor: Johnny Farm, Hagersten (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/516,841

(22) PCT Filed: Jun. 13, 2003

(86) PCT No.: PCT/SE03/00985

§ 371 (c)(1),
(2), (4) Date: Dec. 3, 2004

(87) PCT Pub. No.: WO2004/005097

PCT Pub. Date: Jan. 15, 2004

(65) Prior Publication Data

US 2005/0161299 A1  Jul. 28, 2005

(30) Foreign Application Priority Data

Jul. 3, 2002  (SE) .................................... 0202083

(51) Int. Cl.
*F16D 57/02* (2006.01)
(52) U.S. Cl. ...................... 188/296; 188/293
(58) Field of Classification Search ............... 188/296, 188/290, 293; 60/337, 363, 364, 365
See application file for complete search history.

(56) References Cited

U.S. PATENT DOCUMENTS

| 2,748,900 | A |   | 6/1956 | Booth et al. |
| 3,572,480 | A |   | 3/1971 | Nagel |
| 3,860,097 | A | * | 1/1975 | Braschler et al. ........... 188/296 |
| 4,921,079 | A |   | 5/1990 | Vogelsang |
| 2003/0173169 | A1 | * | 9/2003 | Jonsson ....................... 188/296 |
| 2003/0188940 | A1 | * | 10/2003 | Jonsson et al. .............. 188/296 |

FOREIGN PATENT DOCUMENTS

| DE | 1 950 1 665 | 6/1995 |
| WO | 02/04835 | 1/2002 |

* cited by examiner

*Primary Examiner*—Melanie Torres
(74) *Attorney, Agent, or Firm*—Ostrolenk, Faber, Gerb & Soffen, LLP

(57) ABSTRACT

A hydrodynamic brake which comprises a stator and a rotor, arranged to form a toroidal space, and blades on the rotor and the stator extend into the space. A medium which is intended to be supplied to the toroidal space to effect a braking action. A first pipe circuit for transferring the medium from an outlet from the toroidal space to an inlet to the toroidal space. A second pipe circuit for transferring the medium from a storage space to the toroidal space. The second pipe circuit transfers the medium to the toroidal space via a second inlet which is arranged separately relative to a corresponding first inlet to the first pipe circuit.

16 Claims, 2 Drawing Sheets

HYDRODYNAMIC BRAKE

BACKGROUND TO THE INVENTION, AND STATE OF THE ART

The invention relates to a hydrodynamic brake including a rotor and a stator in shell form which together define an annular working space, and respective blades on the stator and the motor and projecting into the shell. The invention particularly concerns inlet and outlet of working medium to the space.

Oil is commonly used as a working medium of hydrodynamic brakes such as retarders in motor vehicles. The oil is supplied to the toroidal space defined by the stator and rotor of the retarder. The oil exerts in the toroidal space a braking action on the rotor and hence on the vehicle's driveline which is connected to the rotor. During the resulting braking process, the oil's kinetic energy is converted to thermal energy. Upon leaving the toroidal space, the oil is led via a pipe circuit to a heat exchanger before the cooled oil is led back to the toroidal space. To prevent overheating of the oil it is important to maintain a large flow through the toroidal space. With a large oil flow it is also possible to achieve effective cooling of the retarder in association with the toroidal space by means of the circulating oil. A simple way of achieving a large flow of oil through the toroidal space is to utilise the pressure differences which arise in the toroidal space during the operation of the rotor.

WO 02/04835 corresponding to U.S. Pat. No. 6,918,471, commonly owned herewith, describes advantageous positioning of an inlet and an outlet for the oil in the toroidal space whereby the aforesaid pressure differences are utilised to provide a large oil flow through the toroidal space. To that end, the inlet incorporates a multiplicity of input holes arranged on surfaces of the stator where low pressure occurs during operation of the retarder. The outlet incorporates output holes arranged on surfaces of the stator where relatively high pressure occurs during operation of the retarder. The oil is thus easily led into the toroidal space via the input holes and pushed out at high pressure from the toroidal space via the output holes to the pipe circuit which is intended to recirculate the oil to the toroidal space after cooling. Oil from an oil sump is also supplied continuously to the toroidal space during retarder braking. This entails the oil from the oil sump being pumped up to the high pressure which prevails in the pipe circuit which recirculates the oil to the toroidal space after cooling. The pump is thus subject to severe requirements in that it must have sufficient capacity to impart to the oil from the oil sump at least as high a pressure as the oil in said pipe circuit. Severe requirements also apply in this case to the pipe circuit adjacent to the pump to prevent the occurrence of leakage.

SUMMARY OF THE INVENTION

The object of the present invention is to provide a hydrodynamic brake which allows a supply of the medium from the storage space to the toroidal space of the hydrodynamic brake via a relatively simple and hence less expensive pipe circuit.

This object is achieved with the hydrodynamic brake of the kind mentioned in the introduction which is characterised by the invention. The present invention relates to a hydrodynamic brake which comprises a stator and a rotor, arranged to form a toroidal space, and blades on the stator and the rotor extend into the space. A medium is intended to be supplied to the toroidal space to effect a braking action on the rotor via the blades. A first pipe circuit transfers the medium from an outlet from the toroidal space to an inlet to the toroidal space. A second pipe circuit transfers the medium from a storage space to the toroidal space. The second pipe circuit transfers the medium to the toroidal space via a second inlet which is arranged separately relative to a corresponding first inlet to the first pipe circuit.

Using a separate second pipe circuit for the medium which extends from the storage space to a separate second inlet to the toroidal space means that there is no need to impart to the medium in the second pipe circuit the same high pressure of medium as prevails in the first pipe circuit. The risk of leakage in such a second separate pipe circuit whereby the medium is transferred at a relatively moderate positive pressure is considerably less than in a pipe circuit in which a high pressure of medium prevails. This means that the second pipe circuit can be of relatively simple design and be provided at relatively low cost.

According to a preferred embodiment of the present invention, the second inlet incorporates at least one input hole situated in a region where the pressure during a braking process is substantially always lower than the pressure of the medium in the first pipe circuit. The lower the pressure in the toroidal space adjacent to the second inlet, the smaller the capacity required for leading the medium from the storage space, in which atmospheric pressure usually prevails, to the toroidal space. With advantage, the pressure in said region of the toroidal space corresponds substantially to atmospheric pressure during most braking processes. There is substantially no pressure difference between the toroidal space inlet and the storage space. This means that a relatively small capacity is required for transferring the medium to the toroidal space and that the risk of leakage in the second pipe circuit is therefore slight.

According to another preferred embodiment of the present invention, said input holes are situated substantially centrally in the toroidal space. The central region of the toroidal space usually exhibits a pressure which does not differ substantially from atmospheric pressure. It is therefore advantageous that the second pipe circuit should supply the medium to the toroidal space in said central region. The second inlet may be situated adjacent to a free end portion of a blade. The blades of the stator and rotor have a free end portion which extends substantially to a centrally situated plane which extends through the toroidal space between the stator and the rotor. The second inlet is preferably situated in the stator. As the stator, unlike the rotor, is stationary, it is less complicated to arrange the second pipe circuit so that it extends through a stator blade than through a rotor blade.

According to another preferred embodiment of the present invention, the second pipe circuit incorporates a pump for transferring the medium to the toroidal space. Such a pump requires a relatively small capacity and may be of relatively simple design because the difference between the pressure of the medium in the storage space and in the region adjacent to the second inlet of the toroidal space is comparatively small. Such a pump may therefore be provided at relatively limited cost. Said pump is with advantage a gear pump. Gear pumps are of relatively simple design with a small number of constituent parts. Gear pumps are used conventionally in hydrodynamic brakes such as retarders in motor vehicles. In the case here concerned, the gear pump is connected to and is driven by the same shaft as the rotor. The gear pump is thus connected to the vehicle's driveline, runs continuously with the vehicle and pumps the medium continuously from the storage space during vehicle operation. The gear pump pumps the medium to the toroidal space when the retarder is activated, but pumps the medium past the toroidal space back to the storage space when the retarder is not activated.

According to another preferred embodiment of the present invention, the first inlet to the toroidal space incorporates at least one input hole situated in a radially outer region of the stator. Such positioning of the first inlet obviates the need for the portion of the first pipe circuit which is adjacent to the inlet having to extend radially internally about the toroidal space. The outlet from the toroidal space is also preferably situated in a radially outer region of the stator. Such positioning of the outlet likewise obviates any need for the portion of the first pipe circuit which is adjacent to the outlet to have an extent radially internally about the toroidal space. The hydrodynamic brake with both the inlet and the outlet of the first pipe circuit situated in a radially outer region of the stator can be made to occupy less space.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
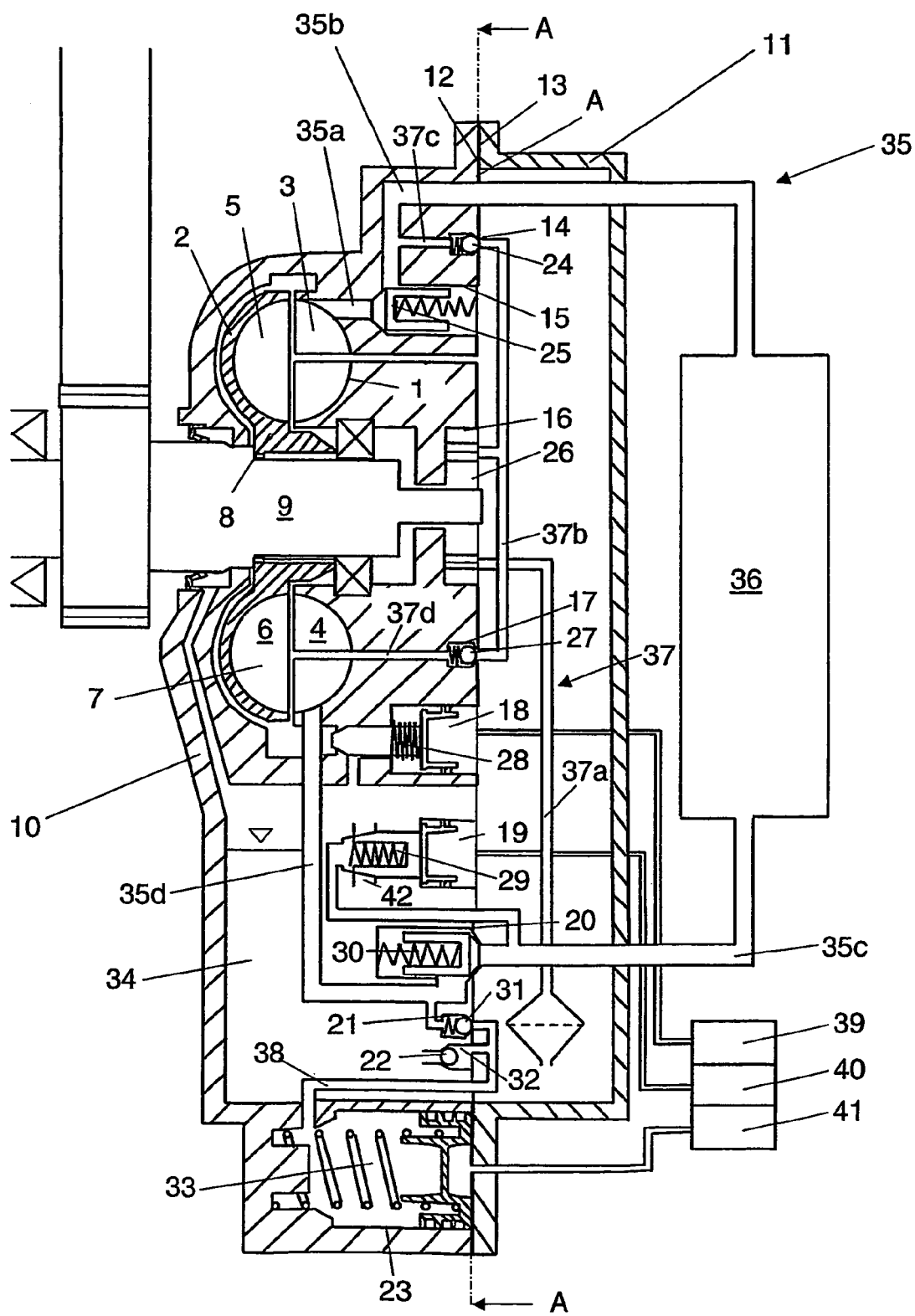
FIG. 1 depicts a section of a retarder according to the present invention.

FIG. 1 depicts a hydrodynamic brake in the form of a retarder of a powered vehicle. The retarder comprises a stator 1 and a rotor 2. The stator 1 has an annular shell 3 with a multiplicity of blades 4 arranged at uniform spacing along the annular shell 3. The rotor 2 is of corresponding design with an annular shell 5 which incorporates a multiplicity of blades 6 likewise arranged at uniform spacing along the annular shell 5. The respective shells 3, 5 of the stator 1 and rotor 2 are coaxially arranged with respect to one another so that they together form a toroidal space 7. The rotor 2 incorporates a shaft portion 8 which is firmly connected to a rotatable shaft 9. The rotatable shaft 9 is itself connected to an appropriate driveshaft of the vehicle's driveline. The rotor 2 will thus rotate together with the vehicle's driveline.

The retarder depicted in FIG. 1 incorporates a housing which comprises a first element 10 and a second element 11. The first element 10 incorporates a body in which inter alia the stator 1 and the rotor 2 are arranged. The second element 11 is of cover-like design and can be fitted detachably along a connecting region 12 to the first element 10 so that in a fitted state they form a closed housing. In the connecting region 12, a gasket 13 is arranged so that the housing forms a sealed enclosure. The first element 10 incorporates a multiplicity of recesses 14–23 which each have an opening in a substantially common plane A represented by the broken line A—A in FIG. 1. The connecting region 12 of the first element 10 and second element 11 also has an extent in said plane A.

The recesses 14–23 are each designed to accommodate a component which forms part of the retarder. The shape and size of the recesses 14–23 are adapted to the respective specific components which they accommodate. A first such recess 14 accommodates a first check valve 24. A second recess 15 accommodates an outlet check valve 25. A third recess 16 accommodates a gear pump 26. A fourth recess 17 accommodates a second check valve 27. A fifth recess 18 accommodates a dump (rapid emptying) valve 28. A sixth recess 19 accommodates a regulating valve 29. A seventh recess 20 accommodates an inlet check valve 30. An eighth recess 21 accommodates a filling valve 31. A ninth recess 22 accommodates an intake valve 32 for filling an accumulator 33. A tenth recess 23 accommodates said accumulator 33. The first element 10 and the second element 11 thus form a sealed housing which incorporates an oil sump 34 for storage of oil.

The retarder incorporates a first pipe circuit 35 with a first portion 35a which leads the oil from an outlet from the toroidal space 7 to the outlet check valve 25. A second portion 35b of the first pipe circuit leads the oil from the outlet check valve 25 to a heat exchanger 36 to cool the oil. A third portion 35c of the first pipe circuit leads the cooled oil to the inlet check valve 30 or alternatively to the regulating valve 29, depending on whether the retarder is or is not activated. A fourth portion 35d of the first pipe circuit leads the oil to an inlet to the toroidal space 7. The retarder incorporates a second pipe circuit 37 with a first portion 37a via which the oil is drawn from the oil sump 34 to the gear pump 26. A second portion 37b of the second pipe circuit 37 leads the oil to the first check valve 24 and the second check valve 27. When the retarder is not activated, the oil is led via the first check valve 24 and a third portion 37c of the second pipe circuit to the second portion 35b of the first pipe circuit. If the retarder is activated, the oil is led instead via the second check valve 27 and a fourth portion 37d of the second pipe circuit to an inlet to the toroidal space 7. The retarder also incorporates a third pipe circuit 38 which connects the accumulator 33 to a fourth portion 35d of the first pipe circuit. The third circuit 38 incorporates the filling valve 31 and the accumulator's intake valve 32. The first element 10 of the housing incorporates, adjacent to the recesses 14–23, occupied ducts which form part of the aforesaid pipe circuits 35, 37, 38.

A first control valve 39 is intended to control, by means of a control pressure, the operation of the safety valve 18 so that the toroidal space 7 can be quickly emptied of oil when necessary. A proportional valve 40 is intended to control, by means of a control pressure, the operation of the regulating valve 19 in order to activate the retarder and regulate the retarder's braking action. A second control valve 41 is intended to control, by means of a control pressure, the operation of the accumulator 33 so as to fill the toroidal space quickly with oil in order to effect a rapid braking action of the retarder. All of these three control valves 39, 40, 41 and the heat exchanger 36 are situated outside the housing.

When the vehicle's driver does not require the vehicle to be subjected to any braking action, the proportional valve 40 supplies no control pressure to the regulating valve 29, which opens fully so that any oil in the third portion 37c of the first pipe circuit drains away, via a passage 42, to the oil sump 34. This means that no oil runs past the inlet check valve 30, which requires relatively high oil pressure for it to open and lead oil to the toroidal space 7. As in this situation no oil is led to the toroidal space 7, substantially no braking action is effected other than a minor undesired braking action due to a so-called no-load loss caused by the rotor circulating the air present in the toroidal space 7.

The driveshaft 9 also drives the gear pump 26 which continuously pumps oil from the oil sump 34 during operation of the vehicle. From the gear pump 26, the oil is led at a positive pressure to the second portion 37b of the second pipe circuit. The first check valve 24 here has a spring with preloading such that it opens at a positive pressure of about 0.5 bar. The second check valve 27 has a spring with preloading such that it opens at a positive pressure of about 2 bar. When the regulating valve 29 is open, there is substantially no positive pressure in the first pipe circuit 35. This means that in the second portion 35b of the first pipe circuit there is no positive pressure which would otherwise increase the opening pressure for the first check valve 24. As the first check valve 24 opens at a lower pressure than the second check valve 27, the oil transferred from the oil sump 34 by the gear pump 26 is only led via the first check valve 24 and the third portion 37c of the second pipe circuit to the second portion 35b of the first pipe circuit, which is thus situated after the toroidal space 7 in the direction of flow of the oil. Thereafter the oil is led back to the oil sump 34 via the heat exchanger 36, the third portion 35c of the first pipe circuit, and the regulating valve 29.

When the vehicle's driver requires the vehicle to be subjected to a braking action, the proportional valve 40 supplies the regulating valve 29 with a control pressure which is greater than the preloading of the inlet check valve 30. The second control valve 41 activates the accumulator 33 so that the latter, via the third pipe circuit 38 and the filling valve 31, leads oil at high pressure to the fourth portion 35d of the first pipe circuit and to the toroidal space 7. The accumulator 33 initiates oil supply by means of a positive pressure to bring about rapid filling of the toroidal space 7 and thereby effect a corresponding rapid braking action of the retarder. After the circulation of the oil in the toroidal space 7, the oil is led out at high pressure via an outlet from the stator 1 to the first portion 35a of the first pipe circuit. The outlet check valve 25 is opened by the high oil pressure and the oil is led to the second portion 35b of the first pipe circuit. At this stage the oil is at a positive pressure of at least 5 bar. The oil in the second portion 35b of the first pipe circuit is also led into the third portion 37c of the second pipe circuit and exerts there a pressure action urging the first check valve 24 towards a closed position. The opening pressure required for the first check valve 24 will thus be higher than the corresponding opening pressure for the second check valve 27 which had a preloading of about 2 bar. This means that all of the oil transferred by the gear pump 26 from the oil sump 34 will be led via the second check valve 27 and the fourth portion 37d of the second pump circuit to an inlet to the toroidal space 7.

The inlet to the toroidal space 7 is with advantage arranged centrally in the toroidal space 7. In the central part of the toroidal space a relatively low pressure prevails in substantially all operating states. Using a separate pipe portion 37d to supply the oil from the oil sump 34 at atmospheric pressure to the toroidal space 7 means that this oil need not be pumped up to the high pressure which prevails in the fourth portion 35d of the first pipe circuit. A less expensive gear pump 26 with a smaller pump capacity can therefore be used. The fourth portion 37d of the second pipe circuit may also be of relatively simple design since it need only be dimensioned to carry oil at a relatively small positive pressure.

The oil is led from the second portion 35b of the first pipe circuit to the heat exchanger 36, in which it is cooled. The braking action of the retarder is regulated by the control pressure from the proportional valve 40. The position of the regulating valve 29 is adjusted by means of the control pressure from the proportional valve 40 so that a certain proportion of the cooled oil after the heat exchanger 36 is led back to the oil sump 34, while the remainder is led past the inlet check valve 30 to the toroidal space 7. The result is regulation of the amount of oil circulating in the toroidal space 7 so as to effect a desired braking action.

Figure 2:
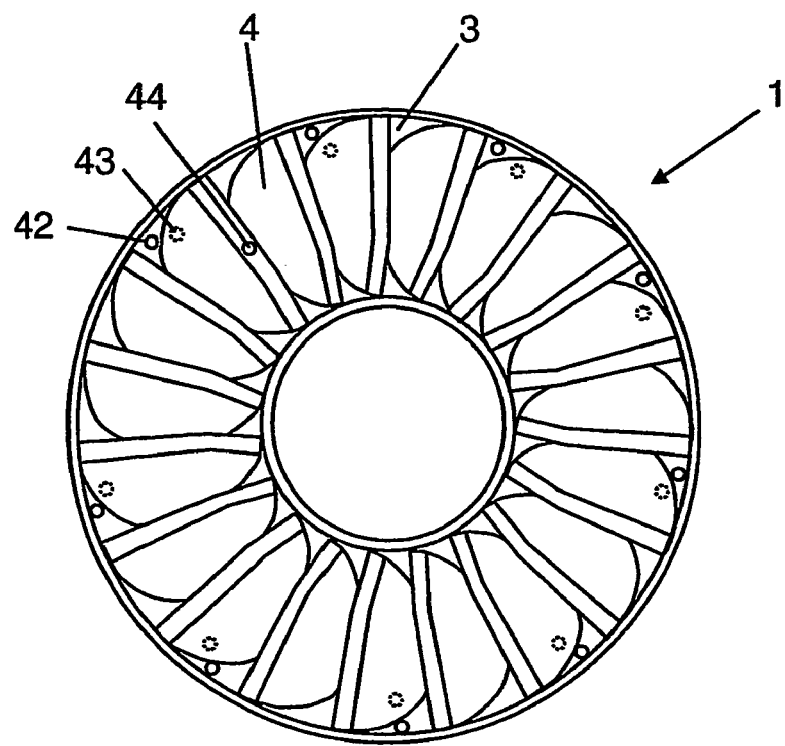
FIG. 2 depicts a stator according to the present invention.

FIG. 2 depicts a stator 1 with an annular shell 3 which incorporates a multiplicity of blades 4 arranged at uniform spacing along the annular shell 3. The fourth portion 35d of the first pipe circuit ends with a first inlet to the toroidal space 7, which inlet incorporates a multiplicity of input holes 42 situated in a radially outer region of the stator 1 on the side of the blades 4 where a relatively low pressure prevails. In a likewise radially outer region of the stator 1, but on the opposite side of the blades 4, output holes 43 are incorporated in an outlet to allow oil to leave the toroidal space 7. On this side of the blades 4 a high oil pressure prevails. The oil is thus supplied to the toroidal space 7 in low-pressure regions and leaves it via high-pressure regions. This pressure difference results in a large oil flow though the toroidal space 7. A large oil flow through the toroidal space 7 has a positive effect in that the oil is not overheated and that there is effective cooling of the retarder in association with the toroidal space 7.

The second pipe circuit 37 thus caters for transfer of the oil from the oil sump 34 to a second inlet to the toroidal space 7 when the retarder is in its active state. The second inlet incorporates an input hole 44 arranged separately relative to the input hole 42 of the first inlet. Using a completely separate second pipe circuit 37 to supply the cold oil from the oil pan 34 to the toroidal space 7 obviates the need to pump the oil up to the pressure which prevails in the first pipe circuit 35. The positive pressure in the first pipe circuit 35 is usually greater than 5 bar. The input hole 44 of the second inlet discharges at a free end portion of one of the blades 4 of the stator 1. The input hole 44 of the second inlet thus provides a supply of oil in a central region of the toroidal space 7. Here a substantially atmospheric pressure prevails substantially independently of the operating state of the retarder. The pressure difference between the oil sump 34 and the central region of the toroidal space 7 to which the oil from the oil sump is supplied is thus marginal. A relatively simple gear pump 26 with a smaller pumping capacity can therefore be used. The second pipe circuit 37 which transfers the oil to the input hole 44 of the second inlet may therefore as a whole be of relatively simple design, since there is no need to convey oil at a large positive pressure. The risk of leakage in the second pipe circuit 37 is thus considerably reduced.

Figure 3:
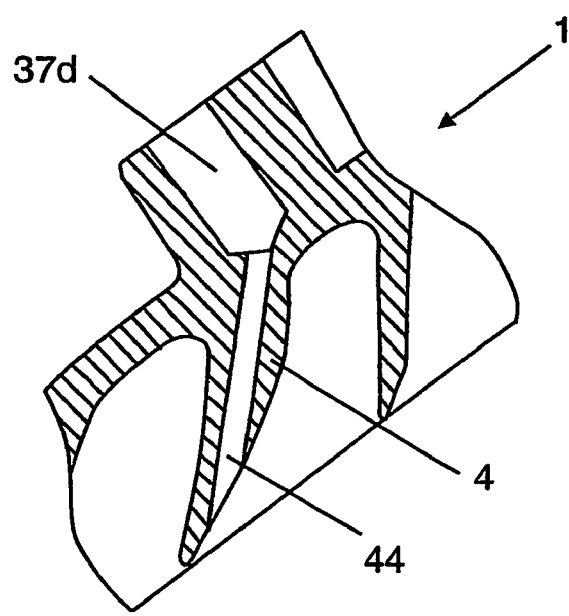
FIG. 3 depicts a section through a portion of the stator in FIG. 2.

FIG. 3 depicts a section though a portion of the stator 1 in FIG. 2. The fourth portion 37d of the second pipe circuit leads here into an input hole 44 which extends through a blade 4 of the stator 1. The input hole 44 discharges adjacent to a free end portion substantially in the middle of the blade 4. The oil is thus supplied to a relatively centrally situated region of the toroidal space 7.

The invention is in no way limited to the described embodiment but may be varied freely within the scopes of the claims.

The invention claimed is:

1. A hydrodynamic brake comprising
   a stator comprising an annular stator shell with a multiplicity of stator blades in and arrayed around the stator shell;
   a rotor comprising an annular rotor shell with a multiplicity of rotor blades in and arrayed around the rotor shell; the annular stator and rotor shells being so shaped and arranged that they form a toroidal space with the stator and the rotor blades in the space, whereby a medium supplied to the toroidal space effects a braking action on the rotor; the space having a first and a second inlet and having an outlet;

a storage space for a medium which is intended to be supplied to the toroidal space;

a first pipe circuit coupled between the outlet from the toroidal space and the first inlet to the toroidal space;

a second pipe circuit coupled between the storage space and the second; and a driver for the medium in the second pipe circuit, wherein a fluid pressure in the second pipe circuit provided by the driver during operation of the brake is always substantially lower than a fluid pressure in the first pipe circuit.

2. A hydrodynamic brake according to claim 1, wherein the second inlet includes an input hole situated in a low pressure region of the toroidal space where the pressure during a braking process of the brake is always substantially lower than the pressure of the medium in the first pipe circuit.

3. A hydrodynamic brake according to claim 2, wherein the pressure in the low pressure region corresponds substantially to atmospheric pressure.

4. A hydrodynamic brake according to claim 2, wherein the input hole of the second inlet is situated substantially centrally in the toroidal space.

5. A hydrodynamic brake according to claim 4, wherein the input hole of the second inlet is situated adjacent to a free end portion of one of the blades.

6. A hydrodynamic brake according to claim 5, wherein the input hole of the second inlet is situated in one of the stator blades.

7. A hydrodynamic brake according to claim 1, wherein the driver is a pump in the second pipe circuit for transferring the medium to the toroidal space.

8. A hydrodynamic brake according to claim 7, wherein the pump is a gear pump.

9. A hydrodynamic brake according to claim 1, wherein the first inlet to the toroidal space includes an input hole situated in a radially outer region of the stator.

10. A hydrodynamic brake according to claim 9, wherein the outlet from the toroidal space includes an output hole situated in a radially outer region of the stator.

11. A hydrodynamic brake according to claim 10, wherein the second inlet includes an input hole situated in a region of the toroidal space where the pressure during a braking process of the brake is always substantially lower than the pressure of the medium in the first pipe circuit.

12. A hydrodynamic brake according to claim 1, wherein the outlet from the toroidal space includes an output hole situated in a radially outer region of the stator.

13. A hydrodynamic brake according to claim 2, wherein:
the outlet from the toroidal space includes an output hole situated in a radially outer region of the stator; and
the input hole of the second inlet is situated substantially centrally in the toroidal space.

14. A hydrodynamic brake according to claim 2, wherein the driver continuously circulates the medium through the second piping circuit, and further including a bypass mechanism operable to direct the medium circulating in the second pipe circuit to the second inlet when a braking operation is required.

15. A hydro dynamic brake according to claim 1, wherein the first inlet includes a series of input holes respectively associated with each of a series of stator blades, and the second inlet is comprised of a single hole situated adjacent to a free end portion of one of the stator blades.

16. A hydrodynamic brake comprising
a stator comprising an annular stator shell with a multiplicity of stator blades in and arrayed around the stator shell;
a rotor comprising an annular rotor shell with a multiplicity of rotor blades in and arrayed around the rotor shell; the annular stator and rotor shells being so shaped and arranged that they form a toroidal space with the stator and the rotor blades in the space, whereby a medium supplied to the toroidal space effects a braking action on the rotor; the space having a first and a second inlet and having an outlet;
a storage space for a medium which is intended to be supplied to the toroidal space;
a first pipe circuit coupled between the outlet from the toroidal space to the first inlet to the toroidal space; and
a second pipe circuit coupled between the storage space and the second inlet;
a continuously operating pump in the second pipe circuit for transferring the medium to the toroidal space; and
a valve operable to direct fluid through the second pipe circuit to the second inlet when a braking operation is required.

* * * * *